Patented Aug. 27, 1946

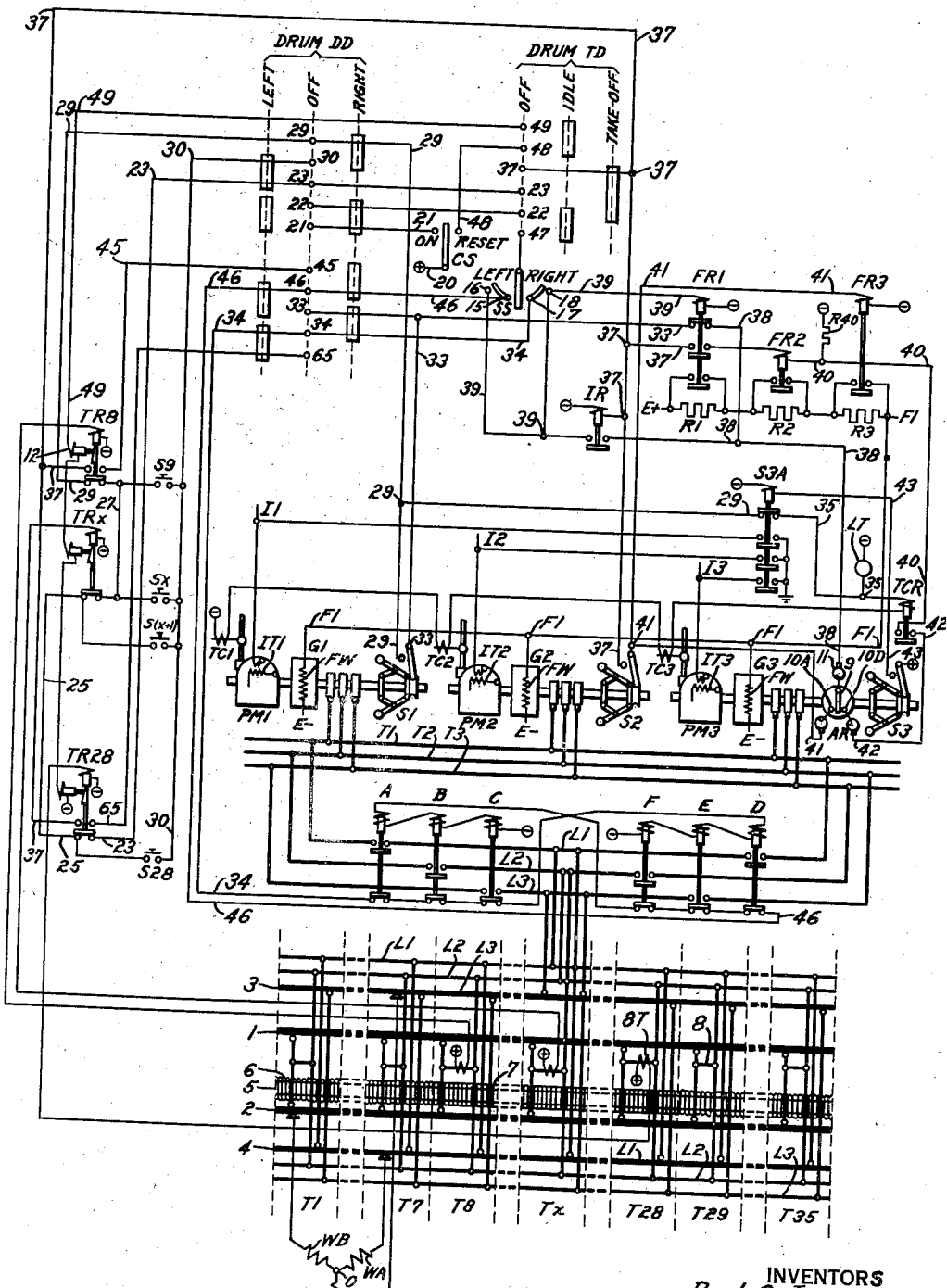

2,406,381

UNITED STATES PATENT OFFICE 2,406,381

PRIME MOVER FOR ELECTRIC CATAPULTS

Ruel C. Jones, Pittsburgh, and Maurice F. Jones, Wilkinsburg, Pa., assignors to Westinghouse Electric Corporation, East Pittsburgh, Pa., a corporation of Pennsylvania Application August 31, 1943, Serial No. 500,641

2 Claims. (Cl. 290—17)

The present invention relates to the control of linear motors and the power plants therefor, in a manner suitable for energizing towing-car catapults for launching aircraft. The general type of apparatus to which the present invention applies constitutes the subject-matter of the description and claims of an application of Frank B. Powers, Serial No. 473,843, filed January 28, 1943, for Electric towing-car catapult for aircraft, assigned to the Westinghouse Electric & Manufacturing Company.

An object of the present invention is to provide means for controlling a power-generating unit in a manner to facilitate obtaining maximum possible power-output from the prime-mover, particularly under conditions where the load is to be accelerated rapidly.

A further object of the invention is to provide a control which is actuated by the rate of change in the speed of the prime-mover, as well as by the speed itself.

Another object of the invention is to provide a power-plant which can be operated at substantially constant speed at full throttle of the engine or engines, the speed being held approximately constant at the speed of the maximum engine-output, the engine or engines being utilized to drive an electric generator or generators which, in turn, drive the catapult motor.

A more specific object of the invention is to hold the engine-speed constant, at approximately its maximum-output point, by means of varying the excitation of the electric generators which are driven by the engine or engines, so as to regulate the electrical power-output at such value or values as may be necessary to keep the engine running at its speed of maximum performance.

A further object of the invention is to provide an overspeed relay, or an acceleration-relay, or both, for shorting out a portion of the field-resistance of the generator or generators of the power plant, in response to a pre-selected speed or a pre-selected rate of acceleration of the engine, as the case may be. In like manner, we provide an underspeed relay, or a deceleration-relay, or both, for introducing a block of field-resistance into the generator field-circuit in response to a slightly lower speed, or in response to a predetermined rate of acceleration of the engine.

With the foregoing and other objects in view, the invention consists in the systems, combinations, apparatus, parts, circuits, and methods, hereinafter described and claimed and illustrated in the accompanying drawing, the single figure of which is a simplified diagrammatic view of circuits and apparatus illustrating the invention in a preferred form of embodiment.

As diagrammatically illustrated in the drawing, an electric catapult involving the present invention includes a linear-motor towing-car, a track therefor, and electrical supply-means and control-means therefor. The towing-car is diagrammatically represented, at the bottom of the figure, by the three-phase primary windings WA, WB, WC of the linear-motor, the winding being illustrated as a star-connected winding having a star-point O.

The track is diagrammatically represented as comprising two track-rails 1 and 2, two third-rails 3 and 4, and a linearly disposed secondary core-member 5 carrying a squirrel-cage secondary-winding, which is represented by the numerals 6 and 7. As described and claimed in an application of Maurice F. Jones, Serial No. 506,197, filed October 14, 1943, the track is preferably fabricated in a plurality of sections T1 to T35, suitably joined together, any desired number of sections being utilized, according to the desired length of run. A certain number of track sections (seven, as illustrated), at each end of the track, have high-resistance squirrel-cage windings, as indicated by the bent or folded end-connections 6 in the drawing. The large intermediate group of track-sections, represented by the twenty-one sections T8 to T28 in the drawing, have low-resistance squirrel-cage windings, as represented by the low-resistance end-connections 7.

Three-phase electric power is supplied to the track, and thence to the car-motor WA, WB, WC, by means of line-conductors L1, L2, and L3, the specific arrangement of which, to suitably reduce the reactance, which might otherwise be excessively high, being the subject-matter of an application of Maurice F. Jones and Lee A. Kilgore, Serial No. 506,198, filed October 14, 1943. Two of the phases of the power-supply are connected to the third-rails 3 and 4, while the third phase, represented by the line-conductor L2, is connected to the two track-rails 1 and 2, by means of connectors 8, there being a separate connection for each section of track.

Electrical power is supplied to the line-conductors L1, L2, and L3, in the one phase-sequence or the other, by means of two groups of electrically operated power-switches A, B, C and D, E, F. The power-switches A, B, and C energize the car-windings WA, WB, WC in the phase-sequence for operation toward the left, while the power-switches D, E, and F are for acceleration toward the right. The power-switches A, B, C, or D, E, F, supply power to the line-conductors L1, L2, L3 from a three-phase bus T1, T2, and T3.

In the form of embodiment of the invention, as illustrated, three-phase power is supplied to the bus T1, T2, and T3 by means of three generators G1, G2, and G3, or other sources of three-phase power which, in the form illustrated, are advantageously sources of somewhat poor voltage-regulation, so that, when the motor-load is particularly heavy, the voltage drops somewhat. The generators G1, G2, and G3 are synchronous generators having field-windings FW. Each generator is driven by its own explosion-type gasoline engine or other prime-mover PM1, PM2, or PM3, as the case may be, each having its own shaft. The field-windings FW of the three generators are excited from an exciter-bus which is represented by the terminals E+ and E—, the exciting-circuit being traceable from the E+ terminal, through three field-resistances R1, R2, and R3, to a common field-winding terminal F1, from which separate connections are made, through the respective field-windings FW, to the negative exciter-bus E—. In normal operation of the generators, with the prime-movers operating, and the field-windings excited, the three prime-mover shafts are electrically synchronized by reason of the common bus-connection of the three-phase generator-terminals T1, T2, and T3.

The power-plant just described includes also three centrifugal switches or other speed-responsive relays S1, S2, and S3, and an accelerometer-relay AR. The first speed-responsive relay S1 is designed to respond when the prime-mover speed is increased from the idling speed up to a speed which begins to approach the normal operating-speed, this relay responding to a speed, perhaps of 2250 R. P. M., or other desired speed. The second speed-responsive relay S2 is designed to pick up sensitively at a speed very slightly above the desired normal operating-speed, and to drop out sensitively at a speed very slightly therebelow, the normal operating speed being the speed at which the prime-movers deliver their maximum output, when operating at full throttle. This second speed-responsive relay S2 may be though of as picking up at 2450 R. P. M., by way of example, and dropping out at 2425 R. P. M. The third speed-responsive relay S3 is an overspeed device which picks up at some overspeed, such as 2800 R. P. M.

The accelerometer-relay AR is designed to respond to a predetermined rate of acceleration or deceleration of the prime-movers. It consists of a central contact-arm 9, which is rotated with the shaft for engaging either an acceleration-responsive contact 10A or a deceleration-responsive contact 10D, when the shaft accelerates or decelerates at a predetermined rate, such as 50 revolutions per minute per second. The accelerometer-relay AR is provided with three slip-rings 11 for making connection to the central relay-arm 9, and the two contact-points 10A and 10D, respectively.

As described in an application of Ruel C. Jones and Maurice F. Jones, Serial No. 500,640, filed August 31, 1943, twenty-one electrically energized track-relays TR8 to TR28 are provided, one for each of the low-resistance track-sections T8 to T28, these track-relays being energized by current-transformers 8T in the individual track-section leads 8 which supply energy to the track-rails 1 and 2 of the corresponding track-sections.

The design is preferably such that any track-relay T$x$ will be energized in response to the power-current which is fed into the towing-car at about the time when the center of the towing-car is near the center of the corresponding track-section T$x$, or at any other predetermined point in the travel of the car, responsive to the point, along the track, at which current is being fed into the car at the moment.

Cooperating with the twenty-one track-relays TR8 to TR28 are twenty selector-switches which are diagrammatically illustrated at S9 to S28, these switches being preferably of the retained-contact type, or any type or kind whereby a predetermined one of these switches may be selected and closed by the operator, in order to pre-select the point in the track at which the towing-car will be deenergized, so as to pre-select the length of run, in accordance with the weight of the aircraft (not shown) to be launched, with due regard to the prevailing direction and velocity of the wind at the time.

Preferably, the track-relays TR8 to TR28 are of the latched type, or other retained-contact type, so that, when once actuated, each will remain in its actuated position until it has been reset, as by means of a reset coil 12.

The control-equipment also includes three field-control relays FR1, FR2, and FR3 for shorting out the respective field-resistances R1, R2, and R3. Further items of the control-equipment include an auxiliary overspeed-relay S3A, an interlock-relay IR, and a throttle-closer relay TCR, all of which will be more specifically referred to in the subsequent description of the operation.

The electrical control equipment for the catapult comprises two control-drums DD and TD, which are shown at the top of the figure, a control-switch CS which is shown between them, and a spotting-switch SS which is shown underneath the drum TD. As indicated, the control-switch has an "On" position and a "Reset" position. The drum DD is a direction-selecting drum having an "Off" position and two operating positions marked "Left" and "Right," corresponding to the desired direction of aircraft-launching. The drum TD is a take-off drum which is illustrated as having an "Off" position, an "Idling" position, and a "Take-off" position. The drawing has been simplified by omitting the "Test" position and contacts of the drum TD, for testing out the various circuits. The spotting-switch SS can be moved to either the left or the right, according to the direction of acceleration or movement desired to be imparted to the car while it is being return to its starting point. This switch has first and second "Left" contacts 15 and 16, and first and second "Right" contacts 17 and 18, the first-position contact-points 15 and 17 being arcuate contacts which are engaged in the second position, as well as in the first position, of the movement of the switch-handle.

The operating-control connections may be traced from the control-switch CS. When this switch is in its normal or "On" position, a circuit is completed from the positive terminal of a suitable source of relaying energy, indicated as a positive bus (+), and a conductor 20, to a conductor 21, which is connected to a correspondingly numbered contact-point on the drum DD.

It will first be assumed that the towing-car is at the left-hand end of the track, at or near the track-section T1, and is to be moved to the right for the purpose of accelerating some aircraft (not shown), for the purpose of launching the same. The direction-selecting drum DD is first moved to its right-hand position, to pre-condition the control-circuits for a right-hand run, and the drum DD will be assumed to be in this position. At the drum DD, the conductor 21 is connected to a conductor 22 which extends to a correspondingly numbered contact-point on the take-off drum TD.

It will be assumed that the three prime-movers PM1, PM2, and PM3 are operating at their idling speed, and that the three generator-fields FW are excited with a minimum excitation, with all three of the field-resistances R1, R2, and R3 in the field-circuit.

When, now, the signal is given for take-off, the operator moves the take-off drum TD to the "Take-off" position, which connects the conductor 22 to the contact-points 23 and 37 of the take-off drum TD. The conductor 23, which is connected to the contact-point 23 of the drum TD, is connected to a correspondingly numbered contact-point of the drum DD, but no contact is made with this point, in the right-hand position of the drum DD. The conductor 23 also extends to a back-contact of the last track-relay TR28, this relay-contact being sufficiently identified by reference to the relay-designation TR28. A relaying circuit is thereupon completed in series through the back-contacts of all twenty-one of the track-relays TR28 to TR8. As only certain illustrative track-relays have been shown, this relaying-circuit can be traced, from the conductor 23 at the relay TR28, through the conductors 25, 27, and 29, and the various relay-contacts, to a correspondingly numbered contact-point 29 on the drum DD.

A pre-selected one of the selector-switches S9 to S28 also was pre-selected, prior to take-off, the usual interlocks being omitted for the sake of clarity. For purposes of illustration, it will be presumed that the selector-switch Sx was closed. This makes a bypassing-connection from the conductor 27 of the track-relay TRx, through the Sx contact to a conductor 30, which extends to a correspondingly numbered contact-point on the drum DD, where a connection is made to the conductor 29, the drum being in its right-hand position. This bypassing-connection thus short-circuits all of the track-relay contacts which are interposed between the conductor 29 and the conductor 27, so that the relaying circuit will not be broken, during the movement of the car, as subsequently described, until the car reaches the track-section Tx and energizes the track-relay TRx, which will thereupon break the connection between the conductor 23 and the conductor 29.

The conductor 29 continues, from the correspondingly numbered contact-point of the drum DD to the first speed-responsive relay S1, which picks up at 2250 R. P. M., or other speed which begins to approach the optimum running-speed of the engine, and makes a contact with a conductor 33, which extends to a correspondingly numbered contact-point 33 on the drum DD. In its right-hand position, the drum DD connects the conductor 33 to a conductor 34, which extends down to the power-switches D, E, F to energize the same, in series with back-contacts on the power-switches A, B, and C, the circuit being completed at the negative terminal (—) at the operating-coil of the relay F. In this manner, the power-switches D, E, and F are energized, closing their main contacts which energize the leads L1, L2, and L3 from the bus-terminals T1, T3, and T2, respectively, thus energizing the car-winding WA, WB, WC in the phase-sequence suitable for driving the car toward the right. This causes the car to start and to rapidly accelerate in its right-hand run, or the run from its starting point at the track-section T1.

It will be noted that the conductor 29 was energized as soon as the take-off drum TD was moved to its "Take-off" position, and that it remained energized until the car reached the pre-selected track-section Tx, as controlled by the selector switch Sx. As soon as this conductor 29 was energized, upon the initial movement of the take-off drum TD to its "Take-off" position, another relaying circuit was made, as described and claimed in an application of Ruel C. Jones, Serial No. 500,638, filed August 31, 1943, through the back-contact of the S3A relay, to a conductor 35 which energizes the TCR relay, and also energizes three throttle-closure magnets TC3, TC2, and TC1 on the three prime-movers PM3, PM2, and PM1. At the same time, a throttle signal-light LT is energized from the conductor 35, so as to provide a signal, at the power-plant (which is usually somewhat removed from the control-station), that the take-off moment has arrived.

The energization of the throttle-closer magnets TC1, TC2, and TC3 either automatically opens the throttles wide (at a predetermined slow rate of opening, commensurate with safety to the engines), or preferably they are utilized merely to stop holding the throttles in their closed or idling positions, so as to make it possible for the engine-attendant to open the respective throttles as soon as the throttle signal-light LT comes on. At any event, gasoline, or other fuel, is supplied to the prime-movers at as rapid a rate as possible, until full-throttle conditions have been reached, and the engines begin to rapidly accelerate from their idling-speed, to their normal operating-speed.

It will be recalled that when the take-off drum TD was first moved to its "Take-off" position, it also energized a contact-point 37 from the conductor 22. From the contact-point 37, a conductor 37 extends to the energizing-coil of the interlocking relay IR, so as to cause it to pick up and close its make-contact.

It will be recalled that the contact-point 33 on the drum DD is the one which is connected to the power-switch conductor 34, in the right-hand position of said drum DD, so that the energization of the conductor 33 applies tractive power to the towing-car for accelerating the car in the pre-selected, right-hand direction, and the deenergization of the conductor 33 discontinues this pre-selected, right-hand energization of the towing-car. The conductor 33 also extends, through a back-contact of the first field-relay FR1, to a conductor 38, which is connected, through the IR relay-contact, to a conductor 39 which energizes the operating coil of said first field-relay FR1. This causes said relay FR1 to pick up and close a holding-contact which energizes the aforesaid conductor 38 from the conductor 37, this holding-contact being made before contact is broken with the conductor 33. This first field-relay FR1 is thus energized simultaneously with the application of power to the towing-car, and it shorts out the field-resistance R1, which brings up the field-excitation to perhaps two-thirds of normal, or other desired value.

The conductor 38 also extends to the operating coil of the second field-relay FR2, and thence to conductor 40, which is connected to the negative bus-terminal (—) through a resistance R40. This causes the relay FR2 to pick up and short out the field-resistance R2, which brings the field up from two-thirds of normal to nearly normal field-strength, or other desired value.

In accordance with our present invention, the conductor 37 also extends to the second centrifugal switch S2, which connects said conductor 37 to a conductor 41, when the prime-mover speed attains its value of maximum power-output, which may be of the order of 2450 R. P. M. The conductor 41 energizes the third field-relay FR3, which picks up and shorts out the field-resistance R3, which overexcites the generator-fields by some 40% or other desired value.

In accordance with our invention, the conductor 38, in addition to energizing the first and second field-relays FR1 and FR2, also extends to the accelerometer-relay AR, and specifically to the movable contact-member 9 thereof. When the prime movers are accelerating at at least a predetermined rate, such as 50 revolutions per minute per second, contact is made with the accelerometer-contact 10A, which is also joined to the conductor 41 which energizes the third field-relay FR3. When the prime-mover speed is decelerating at a similar rate, contact is made with the accelerometer contact 10D, which energizes a conductor 42.

The time-constants of the exciting circuits of the generators G1, G2, and G3 are such, however, that it takes the generators a certain measurable time to build up their excitations after the resistance in the field-circuit has been decreased. In an illustrative example, the generators took about one-fifth of a second to change their excitation half-way from a former value to a subsequent value, in response to any change in the exciting-conditions, which compares with a time requirement of between six and seven seconds for a 400-foot run of the towing-car.

Before the energization of the power-switches D, E, and F, from the conductors 33 and 34, all three of the field-relays FR1, FR2, and FR3 were deenergized, so that the field-excitation, and hence the voltage, of the generators were very low. Thus, the towing-car motor is started with a relatively low voltage applied thereto, and this voltage increases rapidly and smoothly as the field-excitations of the generators build up, in accordance with their time-constants. At the same time, the generator-speed is increasing from the value, such as 2250 R. P. M., which closed the first speed-switch S1, to the normal value of 2450 R. P. M., because full throttle is being applied to the engines as fast as they can safely take the gas or other fuel-oil, while the electrical output of the generators is low because of the slow building up of the generator-fields. In general, therefore, the prime-movers will be accelerating at more than 50 revolutions per minute per second, so that the accelerometer relay AR will connect the conductor 38 to the conductor 41 and energize the field-relay FR3, so as to be increasing the field-strength of the generators at a maximum rate.

As described and claimed in the application of Ruel C. Jones, Serial No. 500,638, the third, or overspeed, centrifugal switch S3 is utilized to energize a conductor 43 from the positive relay-bus (+), and the conductor 43 energizes the operating coil of the auxiliary overspeed-relay S3A. This causes the auxiliary relay S3A to pick up, accomplishing two functions. It opens its back-contact which disconnects the conductor 35 from the conductor 29, thus deenergizing the throttle-control magnets TC3, TC2, and TC1. The energization of the auxiliary overspeed-relay S3A also closes its three make-contacts, which ground the three ignition or magneto-leads I1, I2, and I3 of the three prime-movers PM1, PM2, and PM3, thus grounding the primary-windings of the ignition or magneto-transformers IT1, IT2, and IT3 of the engines.

The deenergization of the throttle-control magnets TC1, TC2, and TC3 may be caused to automatically partially close the throttles, but at a slow rate, taking one second, or other time, to close the throttles to their idling setting, or the control may be left in the hands of the engine-operator in obedience to the signal conveyed by the extinction of the throttle signal-light LT which is extinguished at the same time the throttle-closer magnets TC1, TC2, and TC3 are deenergized. The automatic closure of the throttles is preferred, at a time-rate commensurate with engine-safety.

Since it is impossible, with safety, to close the throttles fast enough to prevent overspeeding of the engines, it is desirable, as described, to short-circuit, or otherwise deenergize, the engine-ignitions, which instantly interrupts the engine-outputs. At the same time, it is desirable to reduce the throttle-setting so as to reduce the quantity of unexploded gas in the engine-cylinders after the ignition or magneto-circuit has been grounded.

The auxiliary overspeed-relay S3A is necessary, as it is not practical to have the four contacts of this relay operated directly by the centrifugal relay S3.

The throttle-control relay TCR has make-contacts which are adapted to connect the conductors 40 and 42, the conductor 42 being connected to the deceleration-contacts 10D of the acceleration-relay AR. Thus, if the engines or prime-movers should be so overloaded that they are decelerating at a rate of 50 revolutions per second, or more, at a time when the engines are operating at full throttle, the accelerometer-relay AR will connect the conductor 38 to the conductor 42, and thence, through the TCR contact, to the conductor 40, which short-circuits the operating-coil of the second field-relay FR2, thus introducing the field-resistance R2 and reducing the load on the engines, allowing the engines to speed up to normal speed again.

Whenever the engine-speed reaches 2450 R. P. M., the second speed-switch S2 operates and energizes the third field-relay FR3, which short-circuits the field-resistance R3 and increases the electrical output of the generators, thus increasing the load on the engines and causing the engine-speed to fall off slightly. When the speed falls to 2425 R. P. M., the S2 centrifugal contact opens and deenergizes the field-relay FR3, thus decreasing the generator-voltage and decreasing the load on the engines, permitting the speed to increase again. Thus the engine-speed, and hence the frequency of the generator-output, are held substantially constant.

It will be recalled that the relay-conductor 37 was energized by the take-off drum TD. As described and claimed in an application of Ruel C. Jones, Serial No. 500,639, filed August 31, 1943, another circuit from the conductor 37 extends to a make-contact of the first track-relay TR8, corresponding to the first track-section T8 having a low-resistance squirrel-cage winding 7. At an early part of the run of the towing-car, when it reaches the track-section T8, the track-relay TR8 picks up, and connects the conductor 44 to a conductor 45 which leads to a correspondingly numbered contact-point on the drum DD, where this conductor is connected to a conductor 46. The conductor 46 leads down to the left-hand, or reversing, power-switches A, B, and C, through back-contacts of the right-hand, or ship-launching, power-switches D, E, and F.

Thus, at an early stage in the movement of the towing-car, a partial relaying-circuit is set up, energizing the reversing power-switch conductor 46 from the positive relaying-bus (+), starting with the conductor 20 at the control-switch CS, and extending through the contact-point 24 of the take-off drum TD. The reverse-phase-sequence power-switches A, B, and C are not immediately energized, however, because the other three power-switches D, E, and F had previously been energized in order to cause the car to move toward the right along the track.

The right-hand power-switches D, E, and F are deenergized, in general, in response to the selector-switch selection Sx, which pre-selects the length of car-run. As soon as all three of the right-hand power-switches D, E, and F are open, the previously partially energized relaying-circuit 46 comes into play, to instantly energize the three left-hand power-switches A, B, and C, so as to immediately apply power to the car in the reverse phase-sequence, producing a force tending to move the car toward the left.

When the "forward" or right-hand power-switches D, E, and F were first deenergized, as a result of a pre-selected length of run, the conductor 29 was deenergized, and this resulted in simultaneously deenergizing the conductor 35 at the back-contact of the auxiliary overspeed relay S3A, simultaneously with the reversed energization of the car-motor WA, WB, WC. The deenergization of the conductor 35 deenergized the throttle-control relay TCR, the throttle signal-light LT, and the throttle-control magnets TC1, TC2, and TC3. As previously described in connection with the operation of the overspeed-relay S3, the deenergization of the throttle-control circuit 35 results in bringing about the slow closure of the engine-throttles to the idling positions of the throttles, this closure being effected in a time which may be of the order of one second or any other time dictated by conditions of safety to the engines.

Meanwhile, however, the car is strongly decelerating, because it is running free of its towing-load, and it has the full output of the generators G1, G2, and G3 applied thereto in the reverse phase-sequence. At the first portion, at least, of this decelerating or braking period of the car, the engines are running at substantially full throttle, as described and claimed in the application of Ruel C. Jones, Serial No. 500,638.

During the one-tenth of a second, more or less, required to open the "forward" power-switches D, E, and F and close the "reverse" power-switches A, B, and C, the engines were operating at full throttle, without any load, and hence the engine-speed accelerated in this brief period of time, sufficiently to close the second speed-responsive switch S2, or the accelerometer-contact 19A, or both, thereby energizing the third field-relay FR3 from the conductor 41, the first two field relays being already energized from the conductor 38. Hence, as described and claimed in the application of Ruel C. Jones, Serial No. 500,638, all three field-relays FR1, FR2, and FR3 are energized, so that the car-braking is effected at full generator-excitation, as well as at substantially the full throttle of the engines, thus delivering the maximum available power to the towing-car in order to bring it to a stop as quickly as possible.

As soon as the towing-car commences its return journey the operator at the take-off drum TD should immediately move said drum to the "Idle" position thereof. This does several things. It deenergizes the conductor 37, from which the reversing power-switch conductor 46, and the field-relays FR1, FR2, and FR3, receive their energization. Hence it deenergizes the power-switches A, B, C, thus deenergizing the towing-car, and leaving it coasting back towards its starting point. It also deenergizes all three of the field-relays, thus inserting the maximum resistance in the field-circuits of the generators. The "Idle" drum-position energizes a contact-point 47 of said drum TD, from the conductor 22, thereby energizing the spotting-switch SS. It also connects two other contact-points 48 and 49 of the aforesaid drum TD to each other, thus electrically connecting the correspondingly numbered conductors 48 and 49.

The car is now coasting back toward its starting-point, the engines are running at their idling-speed, which is considerably lower than their operating-speed, and the generators are operating, not only at this reduced speed, but also at the minimum available field-excitation, so that the frequency and the voltage of the generators is very much reduced, as described and claimed in the application of Ruel C. Jones, Serial No. 500,638.

To bring the car to a standstill, at the starting-point, at the precise spot desired, the spotting-switch SS is utilized. The car is now moving to the left toward the starting-point. To brake the car, the spotting-switch SS is moved to the first point to the right, connecting the conductor 47 to the contact-point 17, and thence to the conductor 34 which energizes the power-switches F, E, D. This applies a small braking-force to the car, and this braking-force is discontinued, at any moment desired, by returning the spotting-switch to its central or neutral position. If the spotting-switch should be left too long on its right-hand position, so that the car starts back again toward the right, the spotting-switch may be touched momentarily on its first left-hand position, engaging the contact-point 15, and thence connecting the conductor 47 to the conductor 46, which momentarily energizes the power-switches A, B, and C. In case of emergency, the spotting-switch may be moved to its second position, engaging either one of its contacts 16 or 18, as the case may be, thus energizing the conductor 39 from the conductor 47, and energizing the first field-relay FR1, which cuts out the field-resistance R1 and provides increased power for controlling the towing-car.

In the "Idling" position of the take-off drum TD, it has been noted that the conductor 48 is joined to the conductor 49. The conductor 48 is connected to the "Reset" position of the control-switch CS, so that, after the car has been brought, with the spotting-switch SS, to its desired position, at either end of the track, the control-switch CS can be moved from its "On" position momentarily to its "Reset" position, thus momentarily energizing the conductor 48 from the conductor 20 and the positive relaying-bus (+). The conductor 48 is connected, in the "Idling" position of the take-off drum TD, to the conductor 49, which energizes all of the reset coils 12 in series, thereby resetting all of the track-switches TR8 to TR28. As soon as these relays are reset (which takes but a moment), the control-switch CS is returned to its "On" position, ready for another launching.

In the preceding explanation, it has been assumed that the car started from track-section T1 and operated toward the right. An important feature of the design, however, is that the car can be operated for take-off in either direction, with equal facility.

Thus, if the car should initially be standing at the other end of the track, or on the track-section T35, so that it would be necessary to take off in a direction toward the left, the direction-selecting drum DD would be moved first to the "Left" position. The effect of this drum-setting would be as folows. The contact-point 21 would again be connected to the contact-point 22. The contact-point 30 would be connected to the contact-point 23 rather than the contact-point 29. The contact-point 34 would be connected to a conductor 65, instead of the conductor 33, and the contact-point 46 would be connected to the conductor 33 instead of the conductor 45.

The changing of the conductor 30 from contact with the conductor 29 to contact with the conductor 23 results in making the selected selector-switch, such as S(x+1), short-circuit the back-contacts of the track-relays between TRx and the conductor 23, rather than between TRx and the conductor 29, so that the conductor 29 remains energized until the selected track-relay TRx is actuated, whereupon the conductor 29 is deenergized, and the accelerating movement of the towing-car is discontinued.

The effect of connecting the contact-point 46 to the conductor 33 instead of the conductor 45 is to make the initial energization of the power-switches an energization of the switches A, B, and C for left-hand operation, under the control of the conductor 33, thus setting up the control-circuits for operation of the car in the left-hand direction.

The effect of connecting the conductor 34 to the conductor 65 instead of the conductor 33 will be seen from observing that the conductor 65 is connected to a make-contact of the track-relay TR28, which corresponds to the first track-section T28 having a low-resistance squirrel-cage winding 7 to be encountered by the car, in its travel toward the left. When the track-relay TR28 picks up, it thus closes its make-contact and connects the conductor 65 to the conductor 37, thus setting up a partial energizing-circuit, through the auxiliary timing-relay TA, which is ready to energize the right-hand power-switches D, E, F as soon as the left-hand power-switches A, B, and C drop out.

Since the operation of the apparatus has been carefully described, in the process of the description, it is believed that no further summary of the operation is necessary. While a single form of embodiment of the invention has been illustrated, it is to be understood that the invention is not limited, in its broader aspects, to any particular form of embodiment, as many changes of addition, omission, and substitution may be made, without departing from the essential features of the invention. It is desired, therefore, that the appended claims shall be accorded the broadest construction consistent with their language.

We claim as our invention:

1. An electric-motored device, and a power-plant delivering a large portion of its energy to said device, said power-plant comprising a rotatable generator-means, prime-mover means for driving said generator-means, said prime-mover means being of a type having a maximum output at a particular speed, a variable field-exciting means for the generator-means, accelerometer-means responsive to a predetermined rate of acceleration or deceleration of the prime-mover means, and automatic control-means operative during a speed-changing period of said electric-motored device to control said field-exciting means in response to said accelerometer-means in such manner as to tend to keep the acceleration or deceleration less than said predetermined rate.

2. An electric-motored device, and a power plan delivering a large portion of its energy to said device, said power-plant comprising a rotatable generator-means, prime-mover means for driving said generator-means, said prime-mover means having throttle-control means and having a maximum output at a particular speed when operating at full throttle, a variable field-exciting means for the generator-means, speed-responsive means responsive to a preselected speed which is close to said maximum-output speed of the prime-mover means, accelerometer-means responsive to a predetermined rate of acceleration or deceleration of the prime-mover means, field-control means operative, when energized, to increase the field-excitation of said generator-means in response to either a response of said speed-responsive means or an acceleration-response of said accelerometer-means, and to decrease said field-excitation in response to either a non-response of said speed-responsive means or a deceleration-response of said accelerometer-means, means for at times operating said prime-mover means substantially unloaded at a reduced speed at a reduced throttle-setting, with the electric-motored device in a substantially non-energized condition, and control-means for at times energizing said electric-motored device from said generator-means for a period of motor-acceleration, said control-means also performing a function which will result in full throttle adjustment being given to said prime-mover means, and said control-means further including means for energizing said field-control means.

RUEL C. JONES.
MAURICE F. JONES.